July 17, 1951 W. G. FORKEY 2,561,105
RADIAL ROLLER BEARING
Filed Nov. 10, 1948
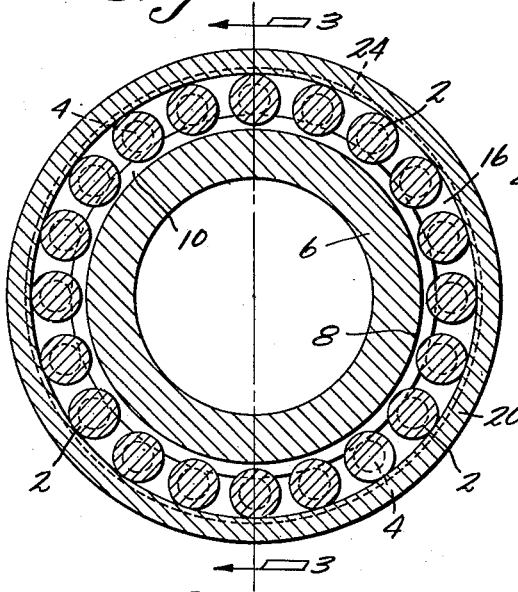
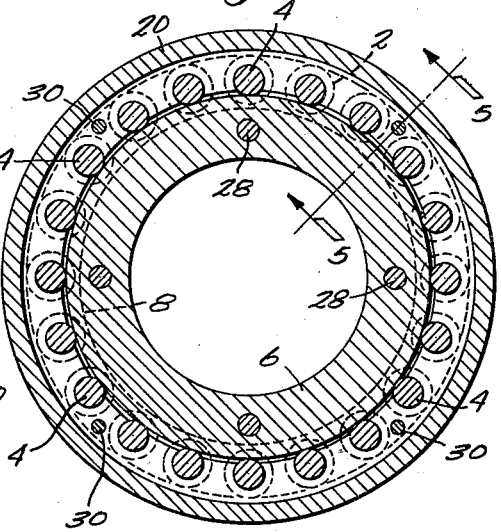
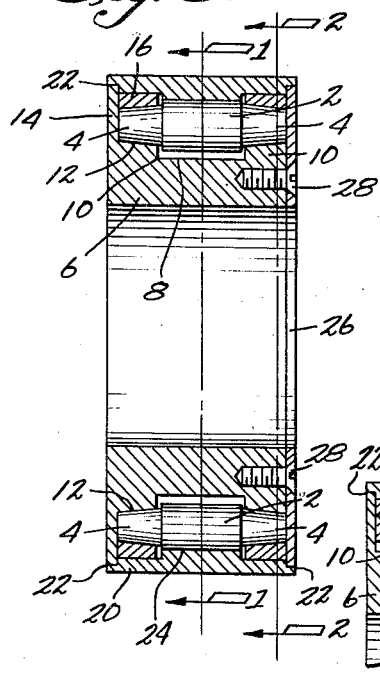
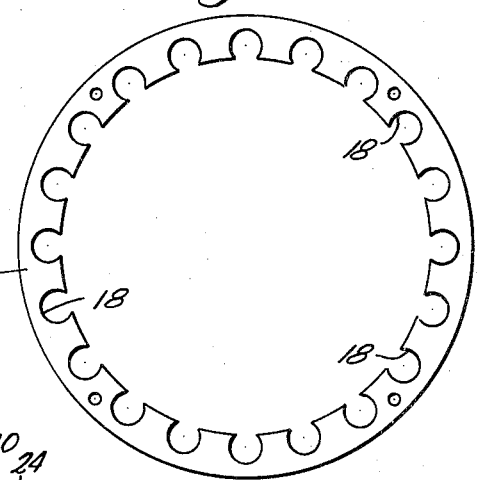
INVENTOR.
Willard G. Forkey,
BY Victor J. Evans & Co.
ATTORNEYS Patented July 17, 1951

2,561,105

UNITED STATES PATENT OFFICE 2,561,105

RADIAL ROLLER BEARING

Willard G. Forkey, Augusta, Ga.

Application November 10, 1948, Serial No. 59,227

1 Claim. (Cl. 308—213)

My present invention relates to an improved radial roller bearing of the type used to support or journal rotary shafts with a minimum of friction, and it is the particular purpose of my invention to employ rollers having central enlarged bodies moving along an outer race and tapered neck ends moving along inner races and the diameter of the roller bearing surfaces is proportionate to the diameter of the respective races.

The theory of these proportionate diameters is that when the diameters are not proportionate the travel of the roller surfaces on their races is not equal and one surface is forced to skid or drag creating friction and heat reducing the efficiency of the bearing and its life.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a vertical sectional view at line 1—1 of Fig. 3.

Fig. 2 is a vertical sectional view at line 2—2 of Fig. 3.

Fig. 3 is a transverse vertical sectional view at line 3—3 of Fig. 1.

Fig. 4 is a plan view of the separator collar.

Fig. 5 is a sectional view at line 5—5 of Fig. 4.

Referring now to the drawings wherein I have illustrated the present preferred embodiment of my invention I employ a series of rollers having cylindrical central bodies 2 and tapered longitudinally extending necks 4.

A circular inner collar 6 has a peripheral recess 8 and shoulders 10 formed with inclined walls 12 to receive the rollers, the tapered necks resting on the walls 12 which form races for the necks.

An outer flange 14 on the collar 6 extends beyond the periphery thereof and forms a backing for ring 16 which is open in the center and has a series of inner arcuate notches 18 into which the necks 4 of the bearing bodies 2, snugly fit.

A cover ring 20 is notched at 22 to fit snugly against the flange 14 and an inner raised rib 24 forms a race for the roller bodies 2.

A flange plate 26 is secured by bolts 28, the separator rings being secured by bolts 30.

As shown in the drawings and described above, the length of the arcs of travel of the bodies 2 and the necks 4 must be proportionate to the radii of the arcs and this is accomplished by making the diameters of the roller bodies and necks proportionate to the diameters of the respective races.

Having thus fully described my invention what I claim as new and desire to secure by Letters Patent is:

In a roller bearing having bearing surfaces of different diameters, said surfaces comprising central cylindrical bodies and tapered necks, an interior collar having a peripheral groove forming a track for the central bodies, inclined walls on the collar forming races for the necks, the diameters of the respective races being proportionate to the diameters of the bearing surfaces whereby the arcs of travel of the surfaces are proportionate, an exterior collar having an integral interior rib forming a race for the central bodies, separate rings having spaced neck receiving notches positioned on opposite sides of the interior rib to form races for the necks, and a plate removably attached to said interior collar and engaging the exterior collar to retain said collars in related relation to each other.

WILLARD G. FORKEY.

REFERENCES CITED

The following references are of record in the file of this patent:

UNITED STATES PATENTS

| Number | Name | Date |
|---|---|---|
| 267,991 | Avery | Nov. 28, 1882 |
| 556,809 | Cook | Mar. 24, 1896 |
| 1,459,974 | Critz | June 26, 1923 |
| 1,474,600 | McNutt | Nov. 20, 1923 |
| 2,197,499 | Heinze | Apr. 16, 1940 |

FOREIGN PATENTS

| Number | Country | Date |
|---|---|---|
| 670,110 | France | Nov. 25, 1929 |